UNITED STATES PATENT OFFICE.

HENRY KELLOGG, OF NEW HAVEN, CONNECTICUT.

ELECTRICAL INSULATOR.

SPECIFICATION forming part of Letters Patent No. 315,633, dated April 14, 1885.

Application filed October 17, 1884. (Specimens.)

*To all whom it may concern:*

Be it known that I, HENRY KELLOGG, a citizen of the United States, residing at New Haven, county of New Haven, State of Connecticut, have invented a new and useful Improvement in Electrical Insulators, of which the following is a specification.

The object of my invention is to produce an insulating compound which can be applied to various electrical conductors so as to efficiently insulate the same, and at the same time be capable of withstanding without deterioration the various injurious influences to which it is likely to be subjected.

The following are the ingredients which I prefer to use as constituents of my insulating compound and their proportionate quantities: four pounds asphaltum, four ounces caoutchouc of oil, one ounce of asbestus, and four ounces India red. The asphaltum is the ordinary refined article of that name.

The caoutchouc of oil is preferably prepared as follows: Take linseed-oil treated with litharge, red lead, or peroxide of manganese, as is usual in making a strong drying-oil. Boil it for several hours at a high degree of heat—say from 500° to 550° Fahrenheit—or until it becomes, when cold, a dark, tenacious mass, like a jelly. This mass is boiled again in dilute nitric acid (about one part of acid to nine of water) for several hours, and when cold it is hard, like rubber. This boiling in the acid raises the melting-point of the oil. It will then melt in boiling water and dissolve in spirits of turpentine, and when the turpentine has evaporated the residuum of oil has lost none of its former elasticity. It is not necessary to boil this caoutchouc of oil in the acid in all cases, unless it is desired to raise the melting-point.

The asbestus is the ordinary commercial article ground to a fine flocculent condition. While being prepared for use it is mixed with a sufficient amount of gum drying japan to give it the consistency of cream, and ground in a common paint-mill to thoroughly mix it together.

The India red is ground with japan in the same manner as the asbestus.

The above ingredients are intimately mixed with the asphaltum, while it is hot, with constant stirring. In so doing the turpentine of the japan passes off by evaporation, leaving only the gum that was in the japan. This mixing operation generally requires about half an hour. When this mass is cool, it is quite friable while in the mass. It is then ready, by being heated, (preferably from 330° to 350° Fahrenheit,) to be applied as an insulator to electric conductors. I prefer the temperature of 330° to 350° Fahrenheit, because at that temperature the compound is properly formed, and is of proper consistency to coat a conductor passing through it at the rate of thirty to fifty feet per minute, while the heat is not sufficient to affect the cotton envelope of the wire.

The asphaltum, which constitutes the body of the compound, is cheap, durable, and indestructible, and one of the best of insulators.

The caoutchouc of oil gives sufficient elasticity to the compound, while maintaining the melting-point sufficiently high, and also maintaining sufficient firmness to resist displacement.

The asbestus, India red, and japan all might be omitted by increasing the proportion of caoutchouc of oil sufficiently to replace the amount of gum contained in the japan omitted; or the asbestus might be used without the India red, or vice versa. The asbestus and India red have a tendency to prevent shrinking and cracking, and the India red also acts as a coloring-matter.

In lieu of the India red and asbestus, other pigments might be used—as, for example, finely-ground feldspar, or quartz, or the like. A substance like feldspar, having no metal in its composition, may, for that reason, be preferred to India red, which contains oxide of iron. The absence of the metallic ingredient probably would have a tendency to increase the perfection of insulation. Feldspar is also cheap and combines readily with the other ingredients of the compound. Whether these substances be substituted for the asbestus or India red in whole or in part, I should consider them as equivalents thereof. When caoutchouc of oil and asphaltum are used alone, a little spirits of turpentine should be added while mixing, since (the spirits of turpentine being a ready solvent of both) a more perfect and intimate mixture is thus obtained. This is an important feature, since otherwise the mixture might be streaked, or some parts of it might have no oil and others no asphaltum. To obtain a perfect and homogeneous mixture, it is necessary to use this solvent, which readily evaporates and leaves the mixture after having performed its office.

The compound described can be applied to any electric conductor, providing that some substance is interposed to prevent the compound coming in direct contact with the metal, so as to stick fast to it.

It is a peculiarity of asphaltum that when brought in contact with metal it unites with or adheres to it by a peculiar affinity, and so close is the connection that the asphaltum will crack and be broken to pieces before it will lose its hold.

An electric conductor to which this insulating compound may be usefully applied and an apparatus to be used in applying it are described in other divisions of this application.

I claim—

1. An insulating compound containing as essential ingredients asphaltum and caoutchouc of oil.

2. An insulating compound containing asphaltum, caoutchouc of oil, and asbestus.

3. An insulating compound containing asphaltum, caoutchouc of oil, and India red.

HENRY KELLOGG.

Witnesses:
 WALTER POND,
 JOHN C. GALLAGHER.